United States Patent
Chiang

(10) Patent No.: US 7,586,539 B2
(45) Date of Patent: Sep. 8, 2009

(54) PORTABLE ELECTRONIC DEVICE WITH CAMERA MODULE

(75) Inventor: Tsung-Wei Chiang, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 363 days.

(21) Appl. No.: 11/416,749

(22) Filed: May 3, 2006

(65) Prior Publication Data

US 2007/0076118 A1 Apr. 5, 2007

(51) Int. Cl.
H04N 5/225 (2006.01)

(52) U.S. Cl. .................. 348/376; 455/556.1; 455/575.1

(58) Field of Classification Search ......... 348/373–376; 455/556.1, 557, 575.1, 575.3, 575.4; D14/142, D14/144; D16/211
See application file for complete search history.

(56) References Cited

U.S. PATENT DOCUMENTS

| 6,281,925 | B1 | 8/2001 | Kosaka | |
| 6,542,721 | B2 * | 4/2003 | Boesen | 455/553.1 |
| 6,803,963 | B2 * | 10/2004 | Yamazaki et al. | 348/375 |
| 7,225,002 | B2 * | 5/2007 | Lee et al. | 455/575.4 |
| 2005/0044665 | A1 * | 3/2005 | Kuramochi | 16/341 |
| 2005/0225668 | A1 * | 10/2005 | Kim | 348/373 |
| 2006/0128449 | A1 * | 6/2006 | Park | 455/575.4 |
| 2006/0234786 | A1 * | 10/2006 | Taniguchi et al. | 455/575.4 |
| 2007/0243896 | A1 * | 10/2007 | Maatta et al. | 455/550.1 |

FOREIGN PATENT DOCUMENTS

| CN | 2403185 Y | 10/2000 |
| JP | 2004235687 A * | 8/2004 |
| WO | WO 2004038941 A1 * | 5/2004 |

* cited by examiner

Primary Examiner—Lin Ye
Assistant Examiner—Dennis Hogue
(74) Attorney, Agent, or Firm—Steven M. Reiss

(57) ABSTRACT

A portable electronic device (100) with camera module includes a main body (10), a cover (30), and a connecting mechanism (20). The main body has a receiving cavity (16) defined therein. The cover has a camera module disposed thereon and facing the main body. The camera module is received in the receiving cavity of the main body. The connecting mechanism includes two connecting poles (22) each of which is arranged on its respective one of the two sides of the main body and the cover, each connecting pole is rotatably connected with the main body and the cover so that when the cover is driven upwards relative to the main body the camera module is removed from the receiving cavity as the cover slides relative to the main body.

20 Claims, 9 Drawing Sheets

PORTABLE ELECTRONIC DEVICE WITH CAMERA MODULE

BACKGROUND OF THE INVENTION

1. Field of the Invention

The present invention relates generally to portable electronic devices and, more particularly, to a portable electronic device with a camera module, where the camera module is protected from contamination and has sufficient space for camera module retraction.

2. Discussion of the Related Art

Recently, with the development of wireless communication technology, more and more digital cameras are being mounted in mobile phones or PDAs.

A typical portable electronic device with camera module such as mobile phone is disclosed in U.S. Pat. No. 6,281,925 issued on Aug. 28, 2001. The mobile phone includes a main body, an antenna, a headphone, a camera module, a display, a switch, a keypad and so on. The camera module is disposed in the main body and exposed out of an outer surface of the mobile phone.

However, this type of portable electronic device with a camera module suffers from a problem in that dust and/or particle pollution/contamination can easily fall into the camera module, thus affecting image quality of the camera module in the mobile phone. In addition, when taking photographs of objects located far away from the mobile phone, sufficient space must be provided such that the camera module can achieve zooming or focusing, which increases a volume of the mobile phone.

What is needed, therefore, is a portable electronic device with camera module, which overcomes the above-described problems.

SUMMARY OF THE INVENTION

A portable electronic device with camera module includes a main body, a cover, and a connecting mechanism. The main body has a receiving cavity defined therein. The cover has a camera module disposed thereon and facing the main body. The camera module is received in the receiving cavity of the main body The connecting mechanism includes two connecting poles, each connecting pole being arranged at a respective one of two sides of the main body and the cover, each connecting pole rotatably connecting with the main body and the cover such that the cover can be driven upwards relative to the main body to make the camera module retreat from the receiving cavity as the cover slides relative to the main body.

Other advantages and novel features will become more apparent from the following detailed description when taken in conjunction with the accompanying drawings.

BRIEF DESCRIPTION OF THE DRAWINGS

Many aspects of the portable electronic device with camera module can be better understood with reference to the following drawings. The components in the drawings are not necessarily drawn to scale, the emphasis instead being placed upon clearly illustrating the principles of the present portable electronic device with camera module. Moreover, in the drawings, like reference numerals designate corresponding parts throughout the several views.

DETAILED DESCRIPTION OF PREFERRED EMBODIMENTS

Figure 1:
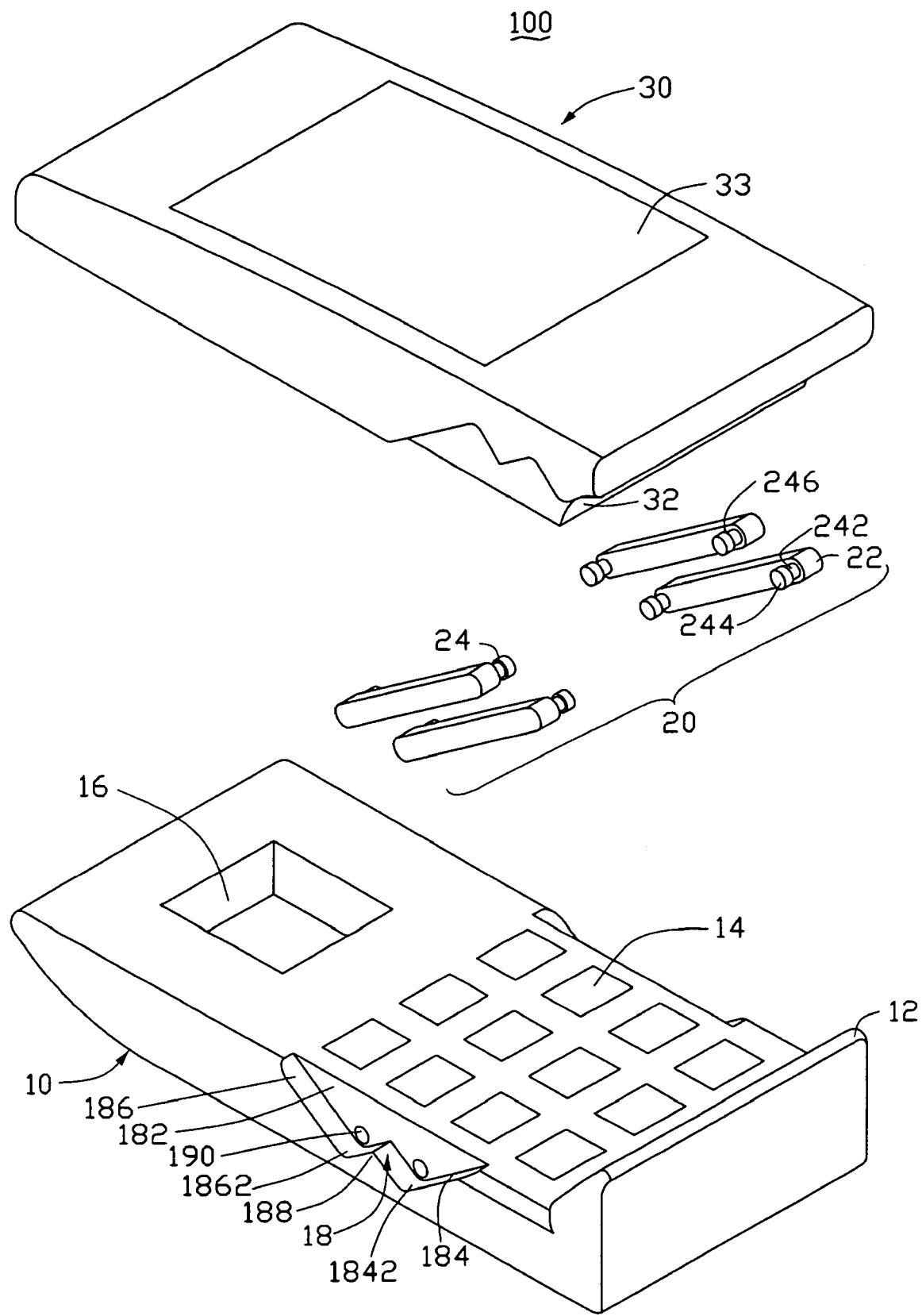
FIG. 1 is an exploded, isometric view of a portable electronic device with a camera module, in accordance with one preferred embodiment.
Figure 2:
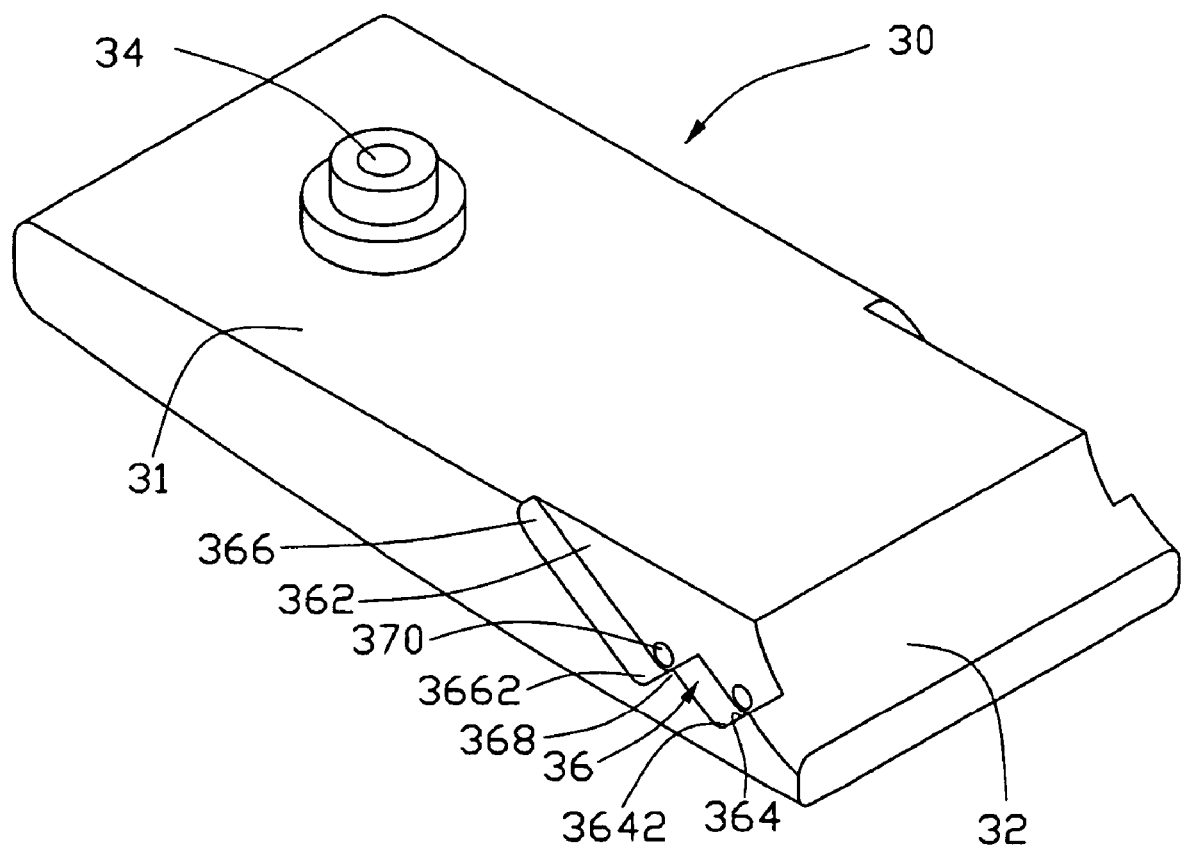
FIG. 2 is an isometric view of a cover of the portable electronic device in FIG. 1.

Referring now to the drawings, FIG. 1 shows a portable electronic device such as a mobile phone 100, according to a preferred embodiment. The mobile phone 100 includes a main body 10, a connecting mechanism 20, and a cover 30. The cover 30 slidably connects with the main body 10 via the connecting mechanism 20.

The main body 10 is substantially rectangular in shape. The main body 10 has a wedge-shaped protrusion 12 protruding from an body surface thereof and adjacent a first end, a plurality of keys 14 arranged adjacent the protrusion 12. The main body 10 has a receiving cavity 16 defined in the body surface thereof and adjacent to a second end opposite to the first end thereof The main body 10 has two W-shaped grooves 18, each one of which is symmetrically and defined in a separate one of the two sides of the main body 10, adjacent to the keys 14. The W-shaped groove 18 is defined by a bottom surface 182 and a W-shaped sidewall (not labeled). The W-shaped sidewall includes a first sidewall 184 and a second sidewall 186. A peak 188 is formed between the first sidewall 184 and the second sidewall 186. The first sidewall 184 and the second sidewall 186 have valleys 1842, 1862. The bottom surface 182 has two step holes 190 defined therein, each one of which is positioned adjacent to a separate one of the valleys 1842, 1862 of the first sidewall 184 and the second sidewall 186 respectively. Each step hole 190 includes a small diameter hole, and a larger diameter hole received in the main body 10.

The connecting mechanism 20 includes four connecting poles 22. Each connecting pole 22 is substantially rectangular. Each connecting pole 22 has two elastic posts 24 protruding from one side, with each extending from its respective one of the two ends thereof. The connecting pole 22 includes a connecting portion 242, and an end portion 244. A diameter of the end portion 244 is larger than that of the connecting portion 242, thus forming a step 246 between the connecting portion 242 and the end portion 244. The diameter of the end portion is larger than a diameter of the small diameter hole of the step hole 190, and equal to a diameter of the larger diameter hole of the step hole 190. A diameter of the connecting portion 242 is equal to or smaller than the diameter of the small diameter hole of the step hole 190. The connecting pole 22 can connect with the main body 10 by means of the elastic post 24 being received in the step hole 190 of the main body 10.

The cover 30 is substantially a plate having a predetermined thickness. The cover 30 has an arcuate surface 32 on an inner surface thereof facing the main body 10, adjacent one end thereof. The cover 30 can be designed with a display 33 on an outer surface thereof. The cover 30 has a camera module 34, corresponding to the receiving cavity 16 of the main body 10. The camera module 34 can be received in the receiving cavity 16. The cover 30 has two W-shaped grooves 36 each defined respectively on a symmetrically opposite side thereof to the other. The W-shaped groove 36 is defined by a bottom surface 362 and a W-shaped sidewall (not labelled). The W-shaped sidewall includes a first sidewall 364 and a second sidewall 366. A peak 368 is formed between the first sidewall 364 and the second sidewall 366. The first sidewall 364 and the second sidewall 366 have valleys 3642, 3662. The bottom surface 362 has two step holes 370 defined therein, each of which is defined at a separate one of the adjacent the valleys 3642, 3662 of the first sidewall 364 and the second sidewall 366 respectively. A shape and size of the step hole 370 is same as that of the step hole 190 of the main body 10.

Figure 3:
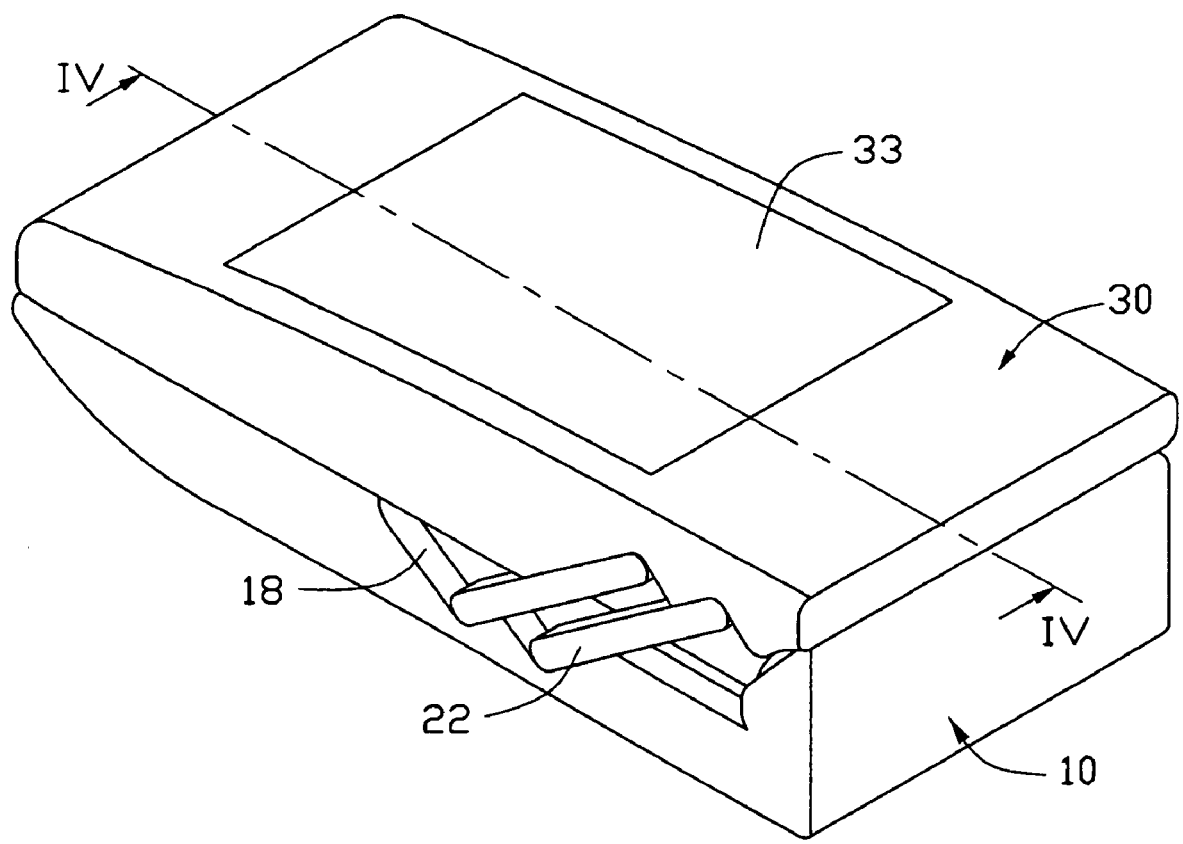
FIG. 3 is an assembled view of the portable electronic device of FIG. 1.
Figure 4:
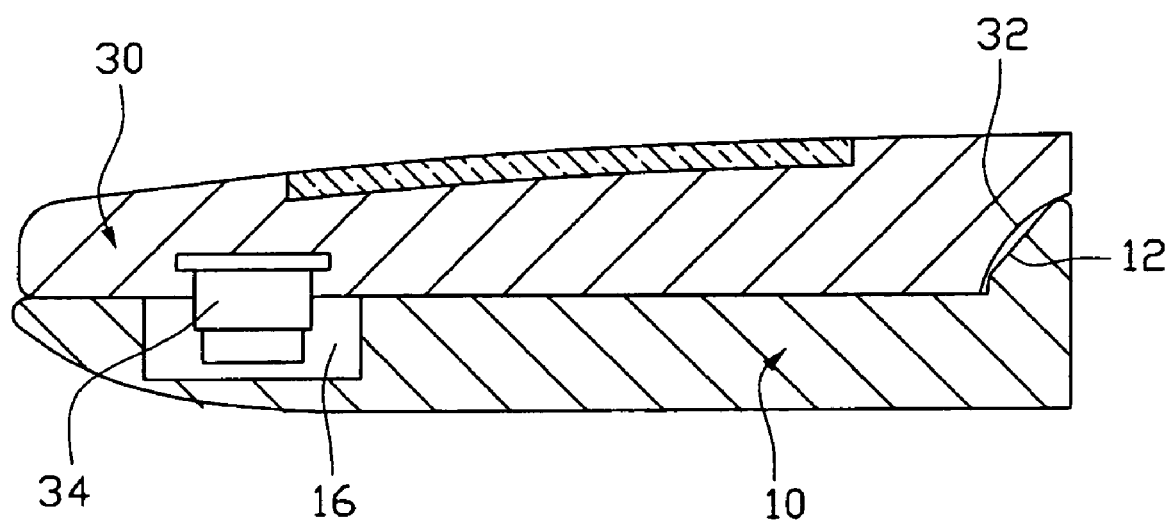
FIG. 4 is a cross-sectional view taken along IV-IV line of FIG. 3.

Referring now to FIG. 3 and FIG. 4, in assembling the mobile phone 100, each two connecting poles 22 are disposed at respective opposite sides of the main body 10 and the cover 30. The two elastic posts 24 of each connecting pole 22 are fittingly received in their respective step holes. One elastic post 24 of each connecting pole 22 is received in the step hole 190 of the main body 10 and one elastic post 24 of each connecting pole 22 is received in the step hole 370 of the cover 30. The end portions 244 are each received in the larger diameter holes of the step holes 190, 370, and the connecting portions 242 are each received in the small diameter holes of the step holes 190, 370. The elastic post 24 of each connecting pole 22 can move in the step holes 190, 370 such that the cover 30 slidably connects with the main body 10. The camera module 34 is received in the receiving cavity 16 of the main body 10. In this state, there are two opposite connecting poles 22 abutting the first sidewalls 184, 364. The arcuate surface 32 of the cover 30 abuts the protrusion 12 of the main body 10. A distance between the step hole 190 of the main body 10 and the step hole 370 of the cover 30 is smaller than a distance between the two elastic posts 24 of each connecting pole 22.

Figure 5:
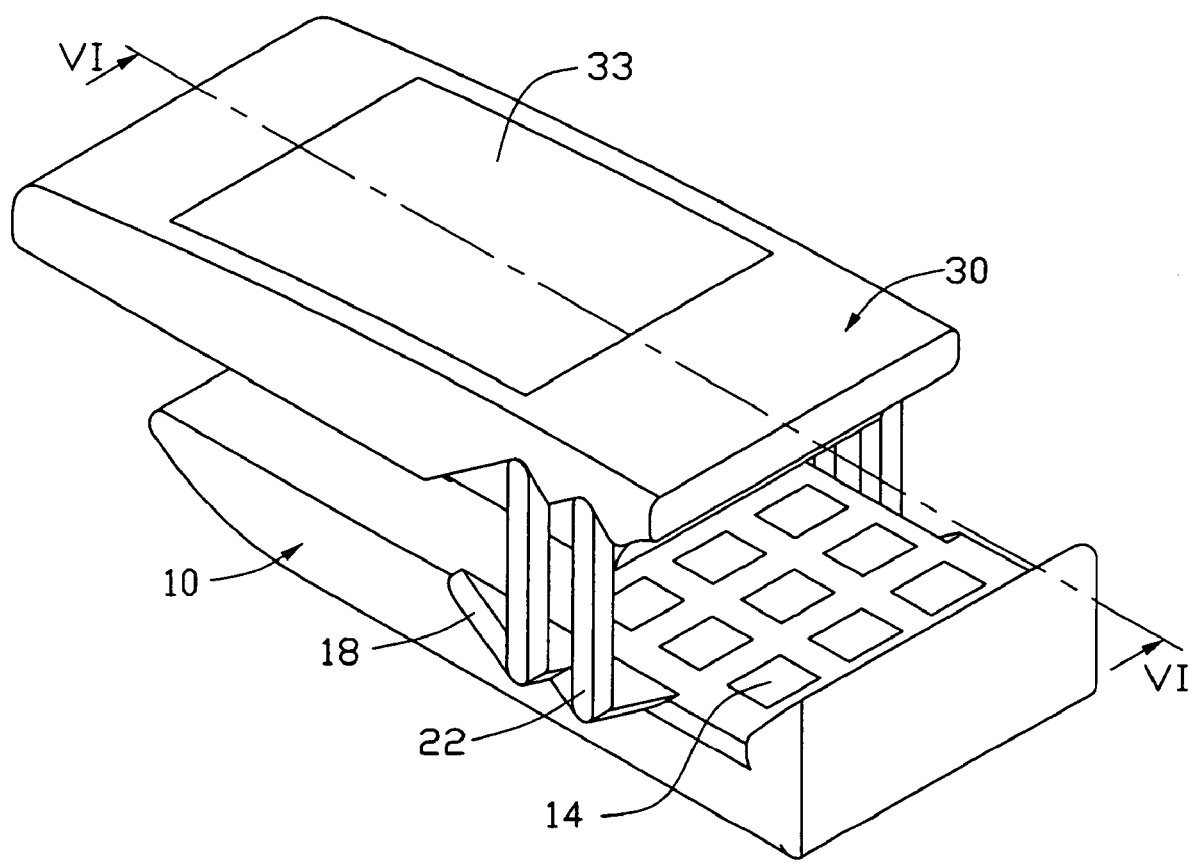
FIG. 5 is an isometric view of the portable electronic device showing the cover in a half-opening state.
Figure 6:
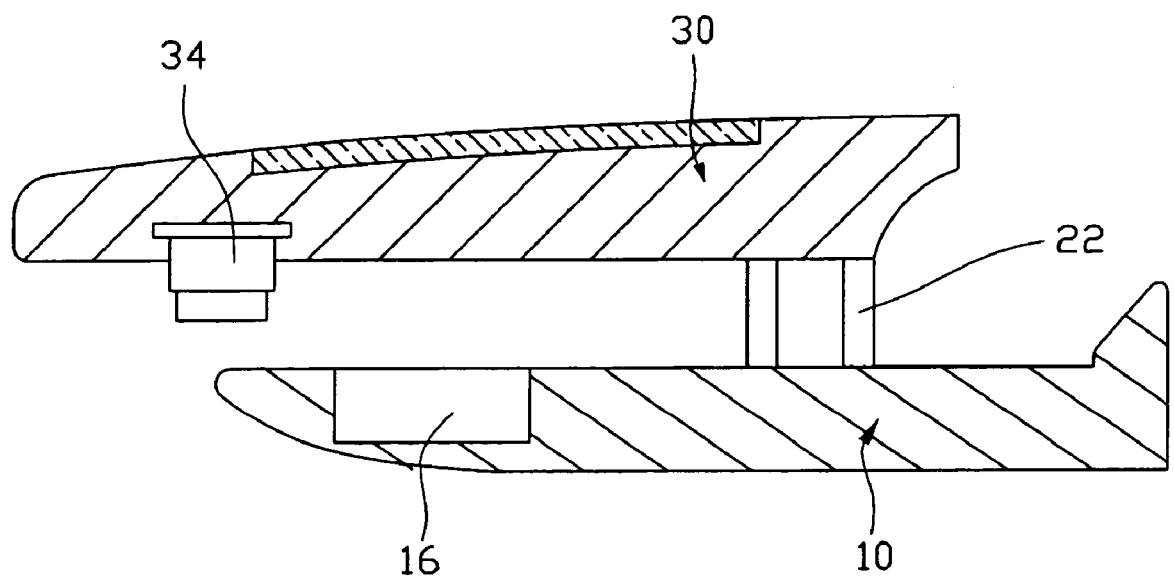
FIG. 6 is a cross-sectional view taken along VI-VI line of FIG. 5.
Figure 7:
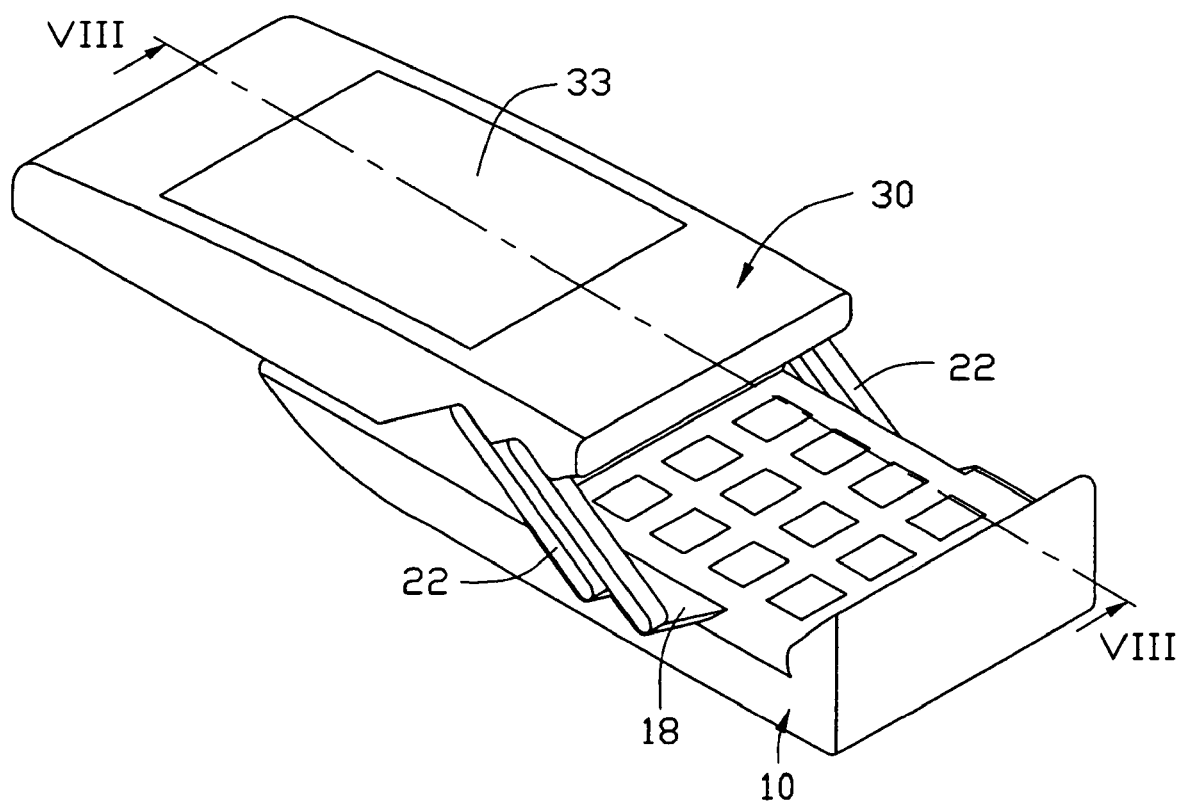
FIG. 7 is similar to FIG. 5, but showing the cover in an open state.
Figure 8:
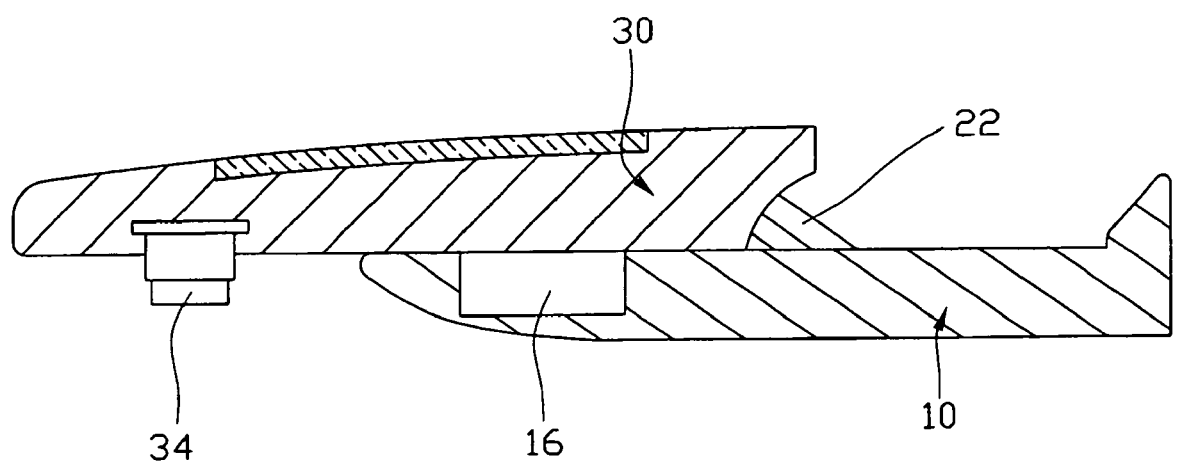
FIG. 8 is a cross-sectional view taken along VI-VI line of FIG. 7.

Referring to FIG. 5 and FIG. 6, in use the cover 30 is manually pushed toward the second end of the main body 10 relative to the main body 10. Simultaneously, the cover 30 is driven upwards relative to the main body 10 by the connecting poles 22. When the cover 30 is in a half-opened state as shown in FIG. 5, the cover 30 is driven up to its maximum height relative to the main body 10, and the ends of each connecting pole 22 abut the valleys 1842, 3642 of the main body 10 and the cover 30 respectively. In this state, the camera module 34 retreats from the receiving cavity 16 of the main body 10. The cover 30 is pushed continuously until another two opposite connecting poles 22 abut the second sidewalls 186, 366 of the main body 10 and the cover 30 respectively (Referring to FIG. 7 and FIG. 8). In this state, a user can operate keys 14 of the main body 10. Also, the camera module 34 can be freely retractable to achieve zooming or focusing and capture images of objects in different locations, instead of occupying space in the mobile phone 100. When not using the camera module 34, the camera module 34 can be retracted. The cover 30 is pushed in a reverse direction such that the camera module 34 can be received in the receiving cavity 16 of the main body 10 again, and can be protected from dust/particles.

Figure 9:
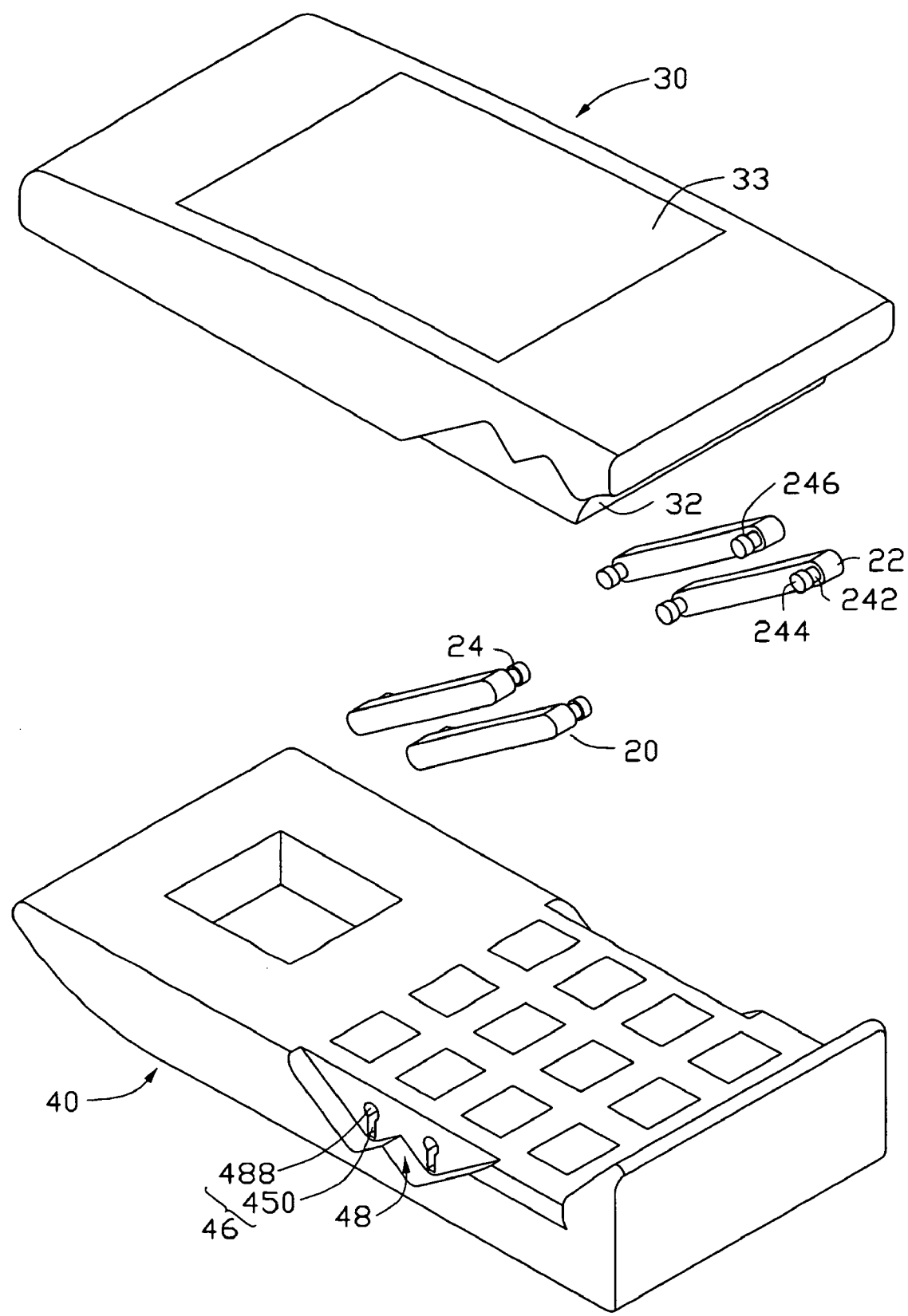
FIG. 9 is an exploded, isometric view of a portable electronic device with camera module, in accordance with another preferred embodiment.

Referring to FIG. 9, in an alternative embodiment, the step holes 190, 370 can be of other structures such as a slot 46. A main body 40 has two W-shaped groove 48 similar to the W-shaped groove 18 of the main body 10. The slot 46 defined in a bottom surface of the groove 48. The slot 46 includes a cylindrical groove 488, and a rectangular groove 450 defined by a larger diameter bottom portion and a rectangular end portion. A width of the rectangular groove 450 is smaller than a diameter of the cylindrical groove 488. The end portion 244 of the connecting pole 22 can be inserted into the cylindrical groove 488. The elastic post 24 of the connecting pole 22 can be inserted into the cylindrical groove 488 and pushed into the rectangular groove 450. The end portion 244 abuts the larger diameter bottom portion in the rectangular groove 488. Lastly, the cylindrical groove 488 can be packed to prevent the elastic post 24 from falling out of the slot 46.

In further alternative embodiment, two sides of the main body 10 and the cover 30 can be respectively arranged one connecting pole 22. The connecting pole 22 can be another connecting mechanism configured for withdrawing the camera module 34 from the receiving cavity 16 of the main body 10 when the cover 30 slides relative to the main body 10.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A portable electronic device with camera module, comprising:
   a main body having a receiving cavity defined therein;
   a cover having a camera module disposed thereon and facing the main body; and
   a connecting mechanism including two connecting poles each respectively arranged at one of the two sides of the main body and the cover, each connecting pole has two elastic posts protruding from one side at both ends thereof, each connecting pole rotatably connected with the main body and the cover such that the cover can be driven relative to the main body to make the camera module movable between a first position where the camera module is received in the cavity and a second position where the camera module is removed from the cavity.

2. The portable electronic device with camera module as claimed in claim 1, wherein each elastic post includes an end portion and a connecting portion.

3. The portable electronic device with camera module as claimed in claim 2, wherein the main body has two first grooves symmetrically and respectively defined in two sides thereof, each first groove being defined in a bottom surface formed on the side of the main body, the bottom surface having a step hole defined therein.

4. The portable electronic device with camera module as claimed in claim 3, wherein the cover has two second grooves symmetrically and respectively defined in two sides thereof, each second groove being defined in a bottom surface formed on the side of the cover, the bottom surface has a step hole defined therein.

5. The portable electronic device with camera module as claimed in claim 4, wherein the two elastic posts of the connecting pole are each rotatably received in their respective step holes of the main body and the cover.

6. The portable electronic device with camera module as claimed in claim 5, wherein the step holes of the main body and the cover include a small diameter hole and a larger diameter bole, the end portion of the elastic post is larger than the small diameter hole, and smaller than the larger diameter hole.

7. The portable electronic device with camera module as claimed in claim 2, wherein the main body has two first grooves symmetrically and respectively defined in two sides thereof, each first groove being defined in a bottom surface formed on the side of the main body, the bottom surface having a first slot defined therein and including a first cylindrical groove, and a first rectangular groove.

8. The portable electronic device with camera module as claimed in claim 7, wherein the cover has two second grooves symmetrically and respectively defined in two sides thereof, each second groove being defined in a bottom surface formed on the side of the cover, the bottom surface having a second slot defined therein and including a second cylindrical groove, and a second rectangular groove.

9. The portable electronic device with camera module as claimed in claim 8, wherein each of the two elastic posts of the connecting pole respectively inserts into the cylindrical groove and slides into the rectangular groove, the end portion of the elastic post is larger than the rectangular groove, and smaller than the cylindrical groove.

10. The portable electronic device with camera module as claimed in claim 1, wherein the connecting mechanism further comprises two connecting poles each respectively arranged on one of two opposite sides of the main body and the cover, each connecting pole being rotatably connected with the main body and the cover.

11. A portable electronic device with camera module, comprising:
a main body having a receiving cavity defined therein, and two first holes respectively defined in two sides thereof;
a cover having a camera module disposed thereon and facing the main body, the camera module received in the receiving cavity of the main body, the cover having two second holes respectively defined in two sides thereof; and
two connecting poles respectively arranged at two sides of the main body and the cover, each connecting pole having two elastic posts formed at one same side thereof, the two elastic posts of each connecting pole being respectively and rotatably received in the first hole of the main body and the second hole of the cover, a distance between the two elastic posts being larger than a distance between a first hole of the main body and the second hole of the cover.

12. The portable electronic device with camera module as claimed in claim 11, wherein each elastic post includes an end portion and a connecting portion.

13. The portable electronic device with camera module as claimed in claim 12, wherein the main body has two first grooves symmetrically and respectively defined in two sides thereof, each first groove being defined in a first bottom surface formed on the side of the main body, the first hole being defined in the first bottom surface.

14. The portable electronic device with camera module as claimed in claim 13, wherein the cover has two second grooves symmetrically and respectively defined in two sides thereof, each second groove being defined in a second bottom surface formed on the side of the cover, the second hole being defined in the second bottom surface.

15. The portable electronic device with camera module as claimed in claim 11, wherein each of the first hole and the second hole include a small diameter hole and a larger diameter hole, the end portion of the elastic post being larger than the small diameter hole and smaller than the larger diameter hole.

16. The portable electronic device with camera module as claimed in claim 11, further comprising two opposite connecting poles respectively arranged on two sides of the main body and the cover, each connecting pole being rotatably connected with the main body and the cover.

17. A portable electronic device, comprising:
a main body having a receiving cavity defined therein, and two first grooves symmetrically and respectively defined in two sides thereof, each first groove being defined with a bottom surface formed on the side of the main body, the bottom surface having a first slot defined therein and the first slot including a first cylindrical groove, and a first rectangular groove;
a cover having a camera module disposed thereon, and two second grooves symmetrically and respectively defined in two sides thereof, each second groove being defined with a bottom surface formed on the side of the cover, the bottom surface having a second slot defined therein and the second slot including a second cylindrical groove, and a second rectangular groove; and
a connecting mechanism including a pair of connecting poles being parallel to each other, each connecting role has two elastic posts protruding from one side at both ends thereof, the elastic posts being inserted into the first and second cylindrical groove and pushed into the first and second rectangular groove, each connecting role rotatably connected with the main body and the cover such that the cover is movable relative to the main body between a first position where the camera module is received in the cavity and a second position where the camera module is removed from the receiving cavity to enable it to take photographs.

18. The portable electronic device of claim 17, wherein the cover is spaced from the main body when the cover is moving between the first and second positions, while contacts the main body when the cover is in the first and second positions.

19. The portable electronic device of claim 17, wherein each elastic post includes an end portion and a connecting portion, the rectangular groove defined by a larger diameter bottom portion and a rectangular end portion, the end portion abuts the larger diameter bottom portion in the rectangular groove.

20. The portable electronic device of claim 17, wherein the main body has a body surface facing the cover, and the receiving cavity is defined in the body surface.

* * * * *

UNITED STATES PATENT AND TRADEMARK OFFICE
CERTIFICATE OF CORRECTION

PATENT NO. : 7,586,539 B2
APPLICATION NO. : 11/416749
DATED : September 8, 2009
INVENTOR(S) : Tsung-Wei Chiang It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 491 days.

Signed and Sealed this

Fourteenth Day of September, 2010

David J. Kappos
*Director of the United States Patent and Trademark Office*